Inventor
Sol L. Reiches
By Frost & Vandenburgh
Attorneys

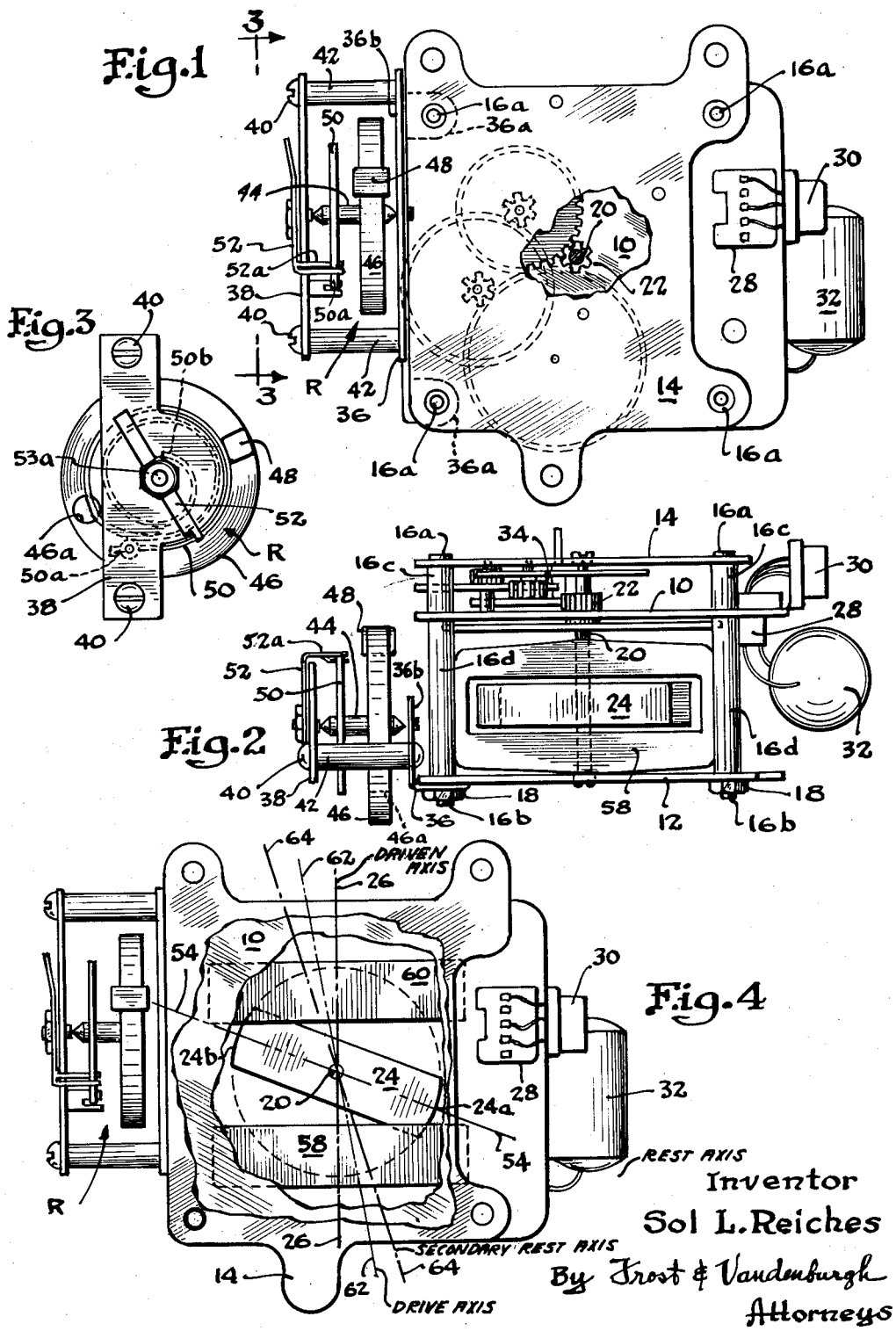

United States Patent Office 3,041,513
Patented June 26, 1962

3,041,513
SELF-STARTING TIMING MOTOR AND METHOD
OF STARTING TIMING MOTORS
Sol L. Reiches, Shaker Heights, Ohio
(4901 Perkins Ave., Cleveland 3, Ohio)
Filed Apr. 20, 1959, Ser. No. 807,530
9 Claims. (Cl. 318—138)

My invention relates to an improved self-starting timing motor and to a method of starting timing motors.

In one form of timer motor, a magnetic rotor, a drive winding, a control winding and a control circuit are so constructed and arranged that as the rotor rotates through a drive axis and towards a driven axis a current pulse is applied to the drive winding to accelerate the rotor momentarily towards the driven axis. During normal motor operation the energy supplied to the rotor in each successive current pulse is equal to the energy drawn from the rotor during the succeeding full rotation. Rotor rotation is accordingly maintained, once the rotor is started. However, with motors of this type—or indeed any motors in which drive pulses are applied in response to rotor rotation past a predetermined axis—the motor will not normally start itself.

In accordance with the present invention, the motor is made self-starting by initially positioning the rotor in an initial rest position. Further in accordance with the present invention, application of energy to the motor serves to define a resultant force biasing the rotor towards a new rest position, here termed the secondary rest axis. This is located at least half way between the rest axis and the drive axis. The rotor thus oscillates from the rest position and about the secondary rest axis when energized and swings to the drive axis at least on the overtravel due to the rotor inertia. As the rotor then travels over the drive axis it acts through the control winding to cause momentary current flow in the drive winding. This accelerates the rotor momentarily towards the driven axis. After such acceleration, the rotor executes a new swing of increased amplitude about the secondary rest axis. When this swing again brings the rotor past the drive axis in the forward direction, the rotor is momentarily accelerated again, giving rise to a further increase in the amplitude of oscillation. The result is a second swing of further increased amplitude about the secondary rest axis, a new drive pulse that increases the swing on the next oscillation, and further swings of increasing amplitude until finally the rotor goes over center in relation to the secondary rest axis and rotates. Each rotation then results in an increase in rotor speed until the energy losses on each cycle of rotation (due to friction, windage, mechanical load, etc.) are equal to the energy supplied by the successive drive pulses.

In accordance with a more particular embodiment of the present invention, the initial bias force holding the rotor to the rest position or axis is supplied by a magnet which also serves in connection with a resilient mounting as a speed regulator. This magnet is so located as to swing the rotor to the desired position in the absence of energy supply to the motor. Further in accordance with the preferred embodiment of the present invention, the secondary biasing force is produced by a constant current through the drive winding itself, this current being of sufficient magnitude to create—with the action of the regulating magnet—a resultant force that urges the rotor to a secondary rest axis almost coincident with the driven axis. With this arrangement, the rotor assumes the rest position in the absence of energy supply to the control circuit and, upon application of such energy, the new biasing force and the regular drive energy are simultaneously effective to bring about the oscillations of increasing magnitude and ultimate motor operation.

It is therefore a general object of the present invention to provide an improved self-starting timer motor.

A more particular object of the present invention is to provide an improved timer motor of the type in which the rotor momentarily receives power on each rotation and in which initial application of power results in rotor oscillations of increasing magnitudes until motor rotation results.

Still another object of the present invention is to provide a motor of the foregoing type in which the biasing force required for initial rotor positioning is supplied by the same magnet that serves as a speed regulating device.

Another object of the present invention is to provide an improved self-starting timer motor in which the application of power causes the rotor to oscillate about a secondary rest axis from an initial automatically assumed rest axis and oscillates in increasing amplitudes about the secondary rest axis until motor action takes place.

Yet another object of the present invention is to provide a motor of the foregoing type in which the speed regulating device serves to bias the rotor to rest axis and yet can be adjusted to vary the regulated motor speed without altering substantially the rest axis or position.

Another object of the present invention is to provide a motor of the foregoing type in which the control circuit uses a transistor and the secondary biasing force is provided by quiescent current flow in the transistor.

Still another object of the present invention is to provide an improved self-starting timer motor in which the drive coil that serves to maintain rotor rotations by successive pulses of current flow also serves by a continuous component of current flow to provide the secondary biasing force required for motor starting.

Yet another object of the present invention is to provide an improved self-starting timer motor of the transistor driven, speed regulated, type in which self starting is provided without the use of parts in addition to those required for motor operation.

Another object of the present invention is to provide an improved process for starting a timer motor of the type in which motor rotation is maintained by a drive pulse applied on each rotation.

Still another object of the present invention is to provide an improved process for starting a timer motor which takes advantage of oscillations of increasing amplitudes to bring about ultimate rotation and motor operation.

Yet another object of the present invention is to provide an improved process for starting a timer motor in which the rotor is conditioned for starting by orienting the same on a rest axis and then, while the rotor is free to move, it is biased towards a secondary rest axis so located that upon each resultant oscillation a drive pulse is applied to the rotor.

It is still another object of the present invention to provide an improved self-starting timer of the transistor driven type in which electrical bias on the transistor serves to provide the secondary mechanical bias required for motor starting and is obtained through the medium of the same capacitor that serves to absorb electrical oscillations that otherwise would cause undesirable power losses.

It is still another object of the present invention to provide an improved timer motor of the type in which a power pulse accelerates the rotor when it passes a predetermined drive axis on each rotation and in which self-starting is effected by presetting the rotor in a predetermined position and thereafter, upon application of motor energizing power, biasing the rotor to a position so located that on the subsequent oscillation from the preset position the rotor crosses the drive axis and executes oscillations of increasing amplitude leading to full rotations and motor action.

The novel features which I believe to be characteristic of my invention are set forth with particularity in the appended claims. My invention itself, however, both as to its construction and mode of operation and the steps of the process employed, together with further objects and advantages thereof, will best be understood by reference to the following description taken in conjunction with the accompanying drawings, in which:

FIGURE 1 is a top plan view of a timer motor constructed in accordance with the present invention;

FIGURE 2 is a side elevational view of the motor of FIGURE 1;

FIGURE 3 is a fragmentary front elevational view of the motor of FIGURE 1;

FIGURE 4 is a view like FIGURE 1 but with parts broken away to show the interior construction of the motor;

*Mechanical Construction*

Figure 6:
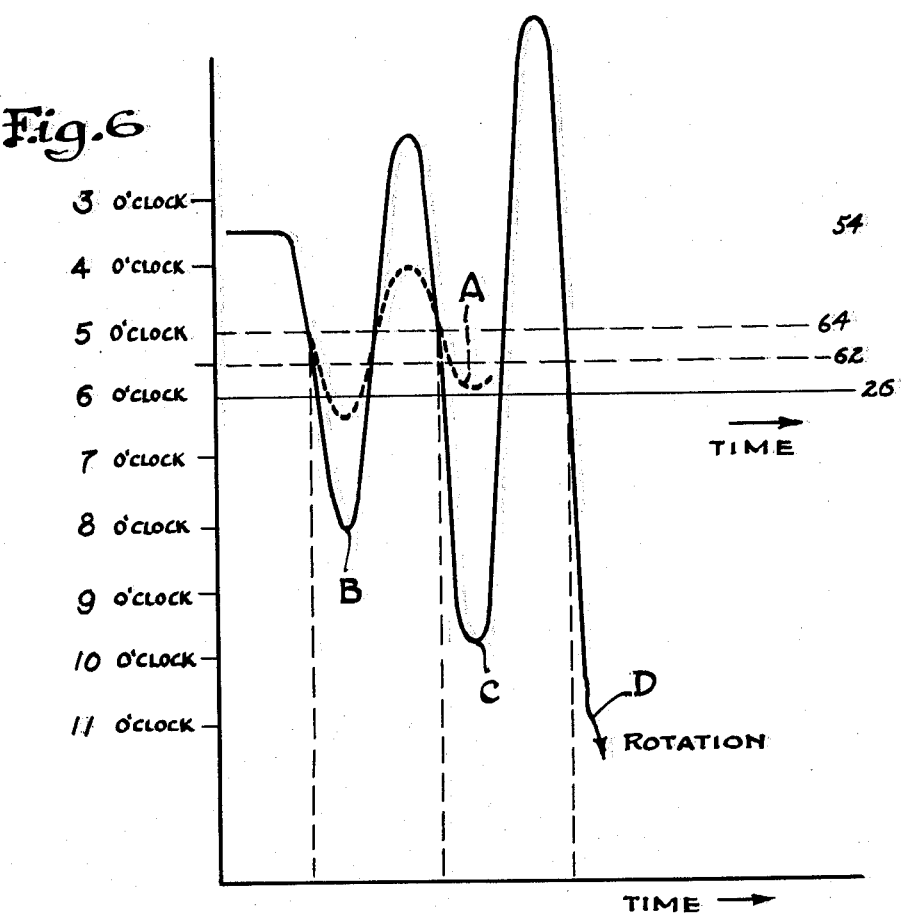
FIGURE 6 is a diagram showing how the motor of FIGURES 1–5 starts.

In the drawings there is shown at 10 and 12 a pair of top and bottom main frame plates. A cover plate 14 of somewhat greater thickness is mounted over and in spaced relation to the top main frame plate 10 as shown. The three plates are sustained in the spaced parallel relationship shown by the pins 16 which at headed ends 16a are received in openings in the cover plate 14. At their opposite ends 16b the pins pass through the plate 12 and are threaded and receive the nuts 18 which are drawn tight to sandwich the sleeves 16c and 16d (through which the pins extend), thus defining a rigid structure having one compartment between plates 10 and 12 and another compartment between the plates 10 and 14. As hereinafter described, the compartment between plates 10 and 12 houses the motor proper and the compartment between plates 14 and 10 houses the gears which drive the load, such as a clock.

The motor proper includes a rotor shaft 20 which is received on suitable aligned bearings (not shown) in the plates 12 and 14, respectively (and passes through a suitable opening in plate 10). The shaft protrudes through the plate 10 as shown in FIGURE 1 and is affixed to the pinion 22 which serves to drive the gear train. Intermediate between plates 10 and 12, the shaft 20 receives the rotor, which appears in side view in FIGURE 2 and top plan view in FIGURE 4. As shown, this rotor is mounted in balanced position on the shaft 20 and is of bar-like construction (although it could have other configurations if desired). The rotor is of a permanent magnet material, such as Alnico III, and is magnetized to define a north magnetic pole at end 24a and a like south magnetic pole at end 24b.

As shown in FIGURE 2, the rotor 24 has an axial extent less than the spacing between the plates 10 and 12. A pair of parallel spaced windings indicated at 58 and 60, FIGURES 2 and 4, straddle the rotor 24 on the opposite sides of the shaft as seen in FIGURE 4. As shown in FIGURE 2, these form windows through which the rotor 24 is free to pass (and hence oscillate or rotate). Thus the windings permit the free mechanical rotation of the rotor 24. These windings are wound in turns extending around the rectangular shape seen in FIGURE 2, thus serving to respond to and to create magnetic fields in the general direction of the axis 26—26, FIGURE 4. For reasons hereafter described in detail, this axis is here identified as the driven axis of the motor.

As further shown in FIGURES 1, 2 and 4, the plate 10 receives a socket 28 for the transistor 30. This socket is of conventional construction and is received in a suitable opening in the plate 10. It is anchored in plate 10 by elements overlaying the opposite sides of the opening. The transistor 30 has connecting prongs or wires, as shown, which are received in the socket to make circuit connections.

A capacitor 32 is connected to the socket 28 and is supported slightly outboard the remainder of the motor by its connecting leads in the usual fashion.

The drive gear mechanism, generally indicated at 34, FIGURE 2 (and shown in partial plan and partial phantom in FIGURE 1), provides a succession of speed stepdown spur gear-bull gear combinations. These serve to reduce the speed and multiply the torque output of the main drive pinion 20. These gears are of the usual clock type and serve to reduce the output shaft speed to the desired value which, of course, depends upon the use to which the timer is put. Since these gears form no part of the present invention, no further description of them is here necessary.

In addition to the foregoing mechanical elements, the timer has a regulating mechanism indicated generally at R, FIGURES 1–4. As shown, this mechanism is supported from the bottom back portion of plate 12 by the bracket 36 which has ears 36a underlaying the bottom pair of the nuts 18. These nuts are drawn tight to secure the bracket 36 to the plate 12. The bracket 36 has a flat plate portion 36b which extends in a plane generally parallel to the shaft 20 as shown. A second support plate 38 is supported in spaced parallel relation to the portion 36b of the bracket 36 by the screws 40 (which are threadedly received in portion 36b of bracket 36) and by the sleeves 42 which encircle these screws.

The regulator shaft 44 extends between aligned points on the bracket part 36b and the plate 38 and is sustained therein by suitable bearings (not shown). This shaft carries a non-magnetic inertia disk 46. The disk 46 at one point of its circumference carries a small ferrite permanent magnet 48 and at a diametrically opposed point receives weight 46a to restore the static and dynamic balance of the disk 46. A spiral spring 50 is anchored at outboard end 50a to the support plate 38 and at its inboard end 50b is affixed to the shaft 44 as shown. This spring resiliently opposes swings of the disk 46 from the neutral or rest position shown in FIGURE 3. A clamp arm 52 is rotatably supported on the plate 38 for adjustable positioning about the axis of the shaft 44 as shown in FIGURE 3. This arm is drawn tight and immovable by the nut 53a, which is loosened to adjust arm 52. This arm has ear 52a, FIGURE 2, which extends towards the spring 50 and is forked at its end to straddle this spring. It will be noted that rotation of arm 52 varies the point at which the outboard end of the spring 50 is held immovable, and hence the spring constant by which it resists rotations of disk 46 from the rest position. This movement does not, however, substantially alter the position of the disk 46 to which it is biased by spring 50.

It will be noted that in the rest position the ferrite magnet 48 is located at about the 3 o'clock position as seen in FIGURE 3. In this position magnet 48 tends to coact magnetically with the rotor 24 to bring the same to the position shown in FIGURE 4, that is with the rotor 24 oriented along the axis 54—54, FIGURE 4. When located in axis 54—54, the rotor is preset for automatic starting. For reasons described hereafter in detail, the axis 54—54 is termed the "rest axis."

It will be further noted that the axis 54—54 is at about the 4 o'clock position in FIGURE 4, whereas the driven axis 26—26 (to which the rotor is drawn upon current flow in winding 58) is at about the 6 o'clock position.

*The Electrical Circuitry*

Figure 5:
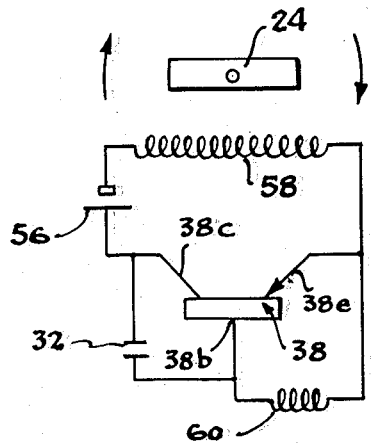
FIGURE 5 is a schematic circuit diagram of the motor of FIGURES 1–4.

The electrical circuit of the motor is shown in FIGURE 5. As shown, the battery 56 is connected through the drive coil windings 58 to the emitter-collector space path of the transistor 38. The current flow in this circuit is accordingly determined by the space path resistance between the emitter 38e and the collector 38c. The control coil 60 is connected between the emitter 38e of the transistor 38 and the base 38b, thus serving to control the voltage between these two electrodes. In so doing, the control coil 60 controls the space path resistance as seen between the emitter 38e and the collector 38c of transistor 38. The capacitor 32 is connected between the collector 38c and the base 38b for the reasons hereinafter described.

In the particular form of the motor here shown, the drive coil winding 58 is located below the shaft 20, as seen in FIGURE 4. As will be apparent from FIGURE 4, current flow in the drive coil 58 produces a magnetic field along the driven axis 26—26 and accordingly tends to drive the rotor 24 to an aligned position in relation to that axis. As above noted, the axis 26—26 is at about the 6 o'clock position as seen in FIGURE 4.

In the form of the motor shown the control coil 60 is located above shaft 20 as seen in FIGURE 4. Since this winding is linked by more flux from the rotor 24 when the same is in the general alignment with driven axis 26—26 than when the rotor is at right angles to this position, the control coil 60 has a voltage induced in it in response to the rotation of the rotor 24. This induced voltage serves to control the current flow in the drive winding 58 and thereby serves to provide motor operation as hereinafter described in detail.

The capacitor 32 serves a dual purpose. First, it absorbs high frequency currents that would otherwise flow in the transistor 38 and other parts and produce power losses without tending to maintain rotor rotation. In addition, in accordance with the present invention, this capacitor is of a type having a relatively low D.-C. resistance value that serves to bias the base 38b in relation to the collector 38c and maintain a predetermined small quiescent current flow in the transistor 38 and hence in the drive winding 58.

In an actual motor constructed in accordance with the present invention, the battery 56 was a mercury cell with a voltage of 2 volts, the drive winding was of number 40 wire wound to a total of 1100 ohms (with the long side of the winding as seen in FIGURE 2 being about 1¼ inches), the control winding 60 was of like construction, and the transistor 38 was a CK722 type transistor. The capacitor 32 was an electrolytic type of about 1 microfarad. In operation the quiescent current flow through the drive coil 58 (with the rotor stationary) was about 100 microamperes, and the current flow with the rotor rotating was about 700 microamperes (average value).

*Normal Motor Operation*

During normal motor operation, the rotor 24 is sustained by its inertia in complete revolutions. This rotation induces an alternating voltage wave in the control coil 60 which—during most of the rotation—is at a low or reverse value in relation to the potential between the base 38b and emitter 38e required to cause substantial current flow in the drive winding 58. However, while the rotor 24 is approaching the driven axis 26, FIGURE 4, the rate of increase of flux linkages in control winding 60 reaches a momentary peak value that brings the voltage between base 38b and emitter 38e to a value causing current flow through winding 58. At this time rotor 24 is approaching but has not reached the driven axis 26. The momentary current flow or pulse has the effect of accelerating rotor 24 towards the driven axis 26 and—since this is the direction the rotor is already rotating—the rotor is accelerated in its existing rotation.

By the time the rotor 24 reaches the driven axis 26 the rate of increase of flux in winding 60 has fallen and the resultant voltage induced therein is below the value required to produce current flow in winding 58. No current flows in the winding 58 from this point until the rotor 24 is again aligned with the drive axis 62, at which time the rate of increase of flux in the winding 60 again reaches the momentary peak required to cause current flow in winding 58 and another drive pulse is applied.

Since the successive pulses of current flow in the winding 58 each impart an increment of energy to the rotor 24, the average speed of rotation of the latter increases until the power taken from the rotor on each revolution is equal to the power supplied from these pulses. The power drawn from the system is due to the windage of the rotating rotor, the friction of the moving parts (including the gear train 34), the power supplied to the motor load (such as a clock indicating mechanism), and the like. As these losses increase with speed of rotation, the rotor 24 accelerates an equilibrium speed value is reached, at which time the energy supplied to the system on each rotation of the rotor 24 (that is, the energy supplied by each drive pulse through the winding 58) is equal to the energy loss per rotation.

The regulating mechanism R serves to control the steady state speed thus attained by the rotor 24 and to permit some adjustment of that speed. The rotatable system including the disk 46 and the associated parts defines an oscillating mass that is spring biased by the spring 50 to the position shown in FIGURE 3 to form a torsion pendulum. Each time the rotor 24 rotates, the magnetic field of the rotor sweeps across the magnet 48 and thereby drives it in one direction or the other. In other words, the magnet 48—and hence the disk 46—is subjected to forced vibrations of frequency determined by the speed of the rotor 24. The rotor disk 46 accordingly oscillates about the neutral or rest position shown in FIGURE 3 in response to rotor rotation. The extent of these oscillations depends upon the constant of the spring 50, effective movement of inertia of the oscillating mass, the degree of magnetic coupling between magnet 48 and the rotor 24, and the energy losses in the oscillating system.

The extent or magnitude of the oscillations of the disk 46 and the associated mechanism increases as the speed of the rotor 24 approaches the natural frequency of oscillations of the disk 46. This increase is exceedingly great with increased speed when the rotor 24 is rotating almost at the speed corresponding to this natural frequency. Since these oscillations of disk 46 dissipate power by reason of friction and windage and other losses, the regulator acts as a speed-sensitive load on the rotor 24 that imposes very greatly increased load as the rotor speed approaches that corresponding to the regulator resonant frequency. In actual operation, the power losses associated with oscillation of the disk 46 when the rotor 24 is at normal operating speed are relatively large in relation to other power losses retarding the rotor 24. The regulator accordingly acts to hold the speed of rotor 24 within narrow limits.

The actual speed held by the regulator R may be varied by moving the regulator arm 52. This arm is anchored in position by the set nut 52a, FIGURE 3, which is first loosened when adjustment is to be made. Rotation of the arm 52 varies the point of the spring 50 which is held in fixed position, changes the effective length and spring constant of this spring in biasing the disk 46 to the rest position shown in FIGURE 3, and thereby changes the natural resonant frequency of the disk 46. The adjustment of the arm 52 accordingly controls the speed value of the rotor 24 at which the rotor power load increases rapidly with speed, and hence the speed at which the total load (including that of the regulator) is exactly balanced by the energy input to the rotating system. It thus controls the regulated rotor speed.

*Practical Starting Operation*

It will be apparent that with the operation of the motor as above described, there is nothing to start the motor from rest. This is because there is then nothing to induce the voltage in the control winding 60 required to cause current flow in the drive winding 58, and hence generate the drive pulses required to maintain the rotor in the rotating state. In accordance with the present invention, this problem is overcome and automatic starting is achieved by the action of the regulator R in conjunction with the action of the capacitor 32.

As above described, the position of the magnet 48 on the regulator R is chosen to cause the rotor 24 to assume the 4 o'clock position of FIGURE 4 when no power is applied to the unit. That is, when the disk 46 of the regulator R is not subjected to external forces it assumes the neutral position determined by the spring 50, at which position the magnet 48 has the position shown in FIGURES 1 and 3. With the magnet in this position, the magnetic attraction due to the pole 24b of the rotor 24 and the field of the magnet 48 causes the rotor 24 to swing to the 4 o'clock position of FIGURE 4. It will be noted that at this time the rotor 24 is free to rotate and a relatively small magnetic torque is sufficient to position the rotor.

When the electrical circuit is energized, as for example by placing the battery 56 in circuit, a small quiescent current flows through the drive winding 58. This current is developed by reason of the bias on the base 38b associated with the resistance of the capacitor 32. As above described, this current flow may be of the order of 100 microamperes in a practical motor. In any event, it produces a magnetic field along the driven axis 26—26 (due to the orientation of the winding 58) and hence biases the rotor 24 towards a position in alignment with the axis 26—26. Since the rotor 24 is now subject to two biasing forces—one towards axis 54—54 and the other towards axis 26—26—there is a rotor position at which the two biasing forces are balances and hence coact to drive the rotor. The actual biasing effect of the small current flow through the winding 58 is much greater than that associated with the action of the magnet 48, so that the resultant bias is towards an axis very close to the driven axis 26. This resultant axis is indicated at 64—64, FIGURE 4, and is termed the secondary rest axis. As shown, it is located at about the 5 o'clock position of FIGURE 4.

It will be noted from the above that, in the absence of application of energy to the system, the rotor 24 seeks—and actually does reach—the primary rest axis 54—54. Upon application of energy and the resultant quiescent current flow through the winding 58, the rotor now seeks the secondary rest axis 64—64. Since the rotor 24, however, is initially at the position 54—54, it follows that the rotor is now accelerated towards the secondary rest axis 64 and approaches the same with increasing velocity. The rotor then overshoots the axis 64 and—in the absence of other events—would execute a series of damped sinusoidal oscillations about the axis 64 and ultimately would come to rest on that axis.

FIGURE 6 shows the above operation. As shown in curve A of that figure, the rotor starts on axis 54 at the instant the unit is energized and then (in the absence of other effects), would oscillate in a series of damped oscillations about the axis 64 until it comes to rest on the axis 64.

However, the above action causes the rotor 24 to swing past the drive axis 62 at substantial velocity, even on the first swing. This is sufficient in conjunction with the action of the winding 60 to cause the emitter-base voltage 38e—38b to reach the level required for current flow in winding 58. A momentary current pulse in the winding 58 accordingly occurs. This pulse accelerates the rotor towards the driven axis 26, FIGURE 4, and thereby increases the rotor overswing past the axis 64, causing it ultimately to reach the point B, FIGURE 6. By the time the rotor reaches the driven axis 26—26, the current flow in the winding 58 is cut off. Hence the rotor now swings about the axis 64 again, the oscillation being of magnitude determined by the angular distance between point B and the axis 64. This may, for example, be between the 8 o'clock position and the 5 o'clock position, as shown in FIGURE 6—a distance of 90 degrees. It will be noted that this is considerably greater than the distance between axis 54—54 and axis 64—64, so that this oscillation is of greater magnitude than the initial oscillation. When, on the swing back of this second oscillation, the rotor now passes axis 64—64 again, the induced voltage in winding 60 again causes the transistor to conduct and there is a new pulse of current flow in the winding 58. This causes still another acceleration of the rotor and drives it to point C, FIGURE 6, on the overswing. This new position may, for example, be at about 10 o'clock. This further increases the amplitude of the oscillation about the axis 64—64, giving, for example, an oscillation between about 10 o'clock and 5 o'clock, or about 150 degrees.

The above action continues in oscillations of progressively increasing magnitude until ultimately the rotor swings a full half turn from its travel across axis 64—64. The rotor now seeks the axis 64—64 by continuing its same direction of rotation rather than by reversing direction as in the oscillations. In other words, the rotor has now passed the dead center position with respect to the oscillations. This point is shown at D, FIGURE 6, for illustration.

Once the rotor commences rotation by reason of the above action it receives a drive pulse on each rotation due to the motor action discussed above. As the rotation begins, the losses in the system due to friction, windage, load, and the action of regulator R are smaller than the energy supplied on each rotation. Hence the rotor accelerates. As the rotor speed increases (and the regulator R approaches its natural oscillation frequency) all of these losses increase. The losses due to regulator R change very rapidly with increased speed. The motor speed is accordingly stabilized at the desired value.

It will be observed that in the above mode of starting, the motor is first conditioned for start by being located along the rest axis 54—54. The rotor is then caused to oscillate about the secondary rest axis 64—64 upon application of energy to the transistor for normal motor operation. The axis 64—64 is so located in relation to the axis 54—54 that during the course of the resultant oscillation the rotor passes through the drive axis 62—62 in the forward direction and thus gives rise to an accelerating drive pulse, buildup of the amplitude of the oscillations, and ultimate motor rotation.

In order that the rotor 24 shall pass the drive axis 62—62 when initially released from a position in alignment with the rest axis 54—54, it is necessary that the secondary rest axis 64—64 be spaced from the driven axis 26—26 by no greater than twice the spacing of axis 26—26 and the drive axis 62—62. This assures that the rotor crosses the drive axis in its travel to the driven axis or at least during the course of its overswing beyond axis 64—64. As a practical matter the axis 64—64 should be closer to axis 26—26 than the axis 62—62 is or—when overswing is relied upon to carry the rotor across axis 62—62— axis 64—64 should be as close as possible to axis 62—62 to provide a short starting time and to assure start under reasonable energy loss from windage, friction, etc.

In the apparatus here described the number of required parts is reduced by using the regulator R as the means to orient the rotor 24 on the rest axis 54—54 and thereby condition the motor for self-starting. It will, of course, be understood that other means may be used for this purpose if desired. Such means, for example, might be a special magnet for the purpose, a hand operated cam device to pre-position the rotor, and the like.

Also, in the apparatus here described the drive coil 58 and the control coil 60 are located in parallel relation to each other and straddling the rotor 24. Other arrangements and orientations of these windings may be used if desired, including, for example, the use of a drive winding in two-part form with one part on each side of the rotor, and the like.

As above described, one form of the present invention contemplates that the base 38b of the transistor be biased in relation to the collector 38c so as to produce a small quiescent current flow through the winding 58. This bias is conveniently obtained from the capacitor 32 since this capacitor is desirable in any event to minimize the effects of high frequency oscillations. If desired, however, a resistor may be used at this point in the circuit in addition to or in lieu of the capacitor. The resistor has some advantage in providing a more exact control of the bias voltage but, since this voltage is not critical, it has been found that reliance on the capacitor is practical.

If desired, the secondary bias on the rotor 24 may be obtained by means other than quiescent current flow in the transistor. Alternatives include a separate winding and current source, continuous current flow in winding 60, etc.

In the foregoing description I have explained the mode of operation of the motor here described in the way it is thought to operate. There are effects, believed to be secondary, which are not mentioned and do influence this operation. One such effect, for example, is the induced voltage in the winding 58 due to rotor rotation, another is the mutual inductance effects between windings 58 and 60, still another is the effect of current flow in winding 60 on the motion of the rotor. The operation as here described, however, is in accordance with observed physical effects and is believed essentially correct as a practical analysis of the operation of the motor.

While I have shown and described a particular embodiment of the present invention it will, of course, be understood that I do not intend to be limited thereto and that by the appended claims I intend to cover all combinations and alternative constructions, as well as modifications of the process, that fall within the true spirit and scope of the claims.

What I claim as new and desire to secure by Letters Patent of the United States is:

1. A self-starting timing motor comprising in combination: a rotor; means sustaining the rotor for rotation about a predetermined axis, said rotor defining a pair of diametrically opposed magnetic poles; a drive winding; means sustaining the drive winding in magnetic cooperation with the rotor, whereby current flow in the drive winding causes the rotor to seek a predetermined orientation; energizing means operable to produce a low continuous current flow in the drive winding irrespective of rotor movement and responsive to rotor rotation in predetermined direction to cause momentary relatively large current flow in the drive winding as the rotor approaches said predetermined orientation, thereby sustaining rotor rotations once the same are initiated, the speed of rotor rotation being determined by the point of equilization of drive energy per rotation and energy loss per rotation; and a magnet resiliently supported and within the magnetic field of the rotor to execute forced vibrations at the speed of rotor rotation, the natural frequency of the magnet being slightly above normal rotor speed of rotation, whereby the magnet defines a speed-sensitive energy dissipating device that serves to regulate steady state rotor speed, the magnet in rest position being located to orient the rotor at an angle to said predetermined orientation in the absence of rotor movement and said low continuous current flow, the force exerted by said magnet being such that when said low continuous current flow takes place, the rotor seeks a position of rest towards said predetermined orientation and passes through said orientation in the resultant oscillation, whereby upon initiation of operation of said energizing means the rotor transiently oscillates about said position of rest and in so doing initiates the larger current pulses incident to rotor rotation and ultimately progresses into complete rotations and motor action.

2. A self-starting timing motor comprising in combination: a rotor, means sustaining the rotor for rotation about a predetermined axis, said rotor defining a pair of diametrically opposed magnetic poles; a drive winding; means sustaining the drive winding in magnetic cooperation with the rotor, whereby current flow in the drive winding causes the rotor to seek a predetermined orientation; energizing means operable to produce a low continuous current flow in the drive winding irrespective of rotor movement and responsive to rotor rotation in predetermined direction to cause momentary relatively large current flow in the drive winding as the rotor approaches said predetermined orientation, thereby sustaining rotor rotations once the same are initiated; a magnet; resilient support means for the magnet sustaining the same in the magnetic field of the rotor to execute energy dissipating forced vibrations in response to rotor rotation and thereby regulate the rotor speed, the magnet in rest position being located to orient the rotor at a position at an angle to said predetermined orientation in the absence of rotor movement and said low continuous current flow, the force exerted by said magnet being such that when said low continuous current flow takes place, the rotor seeks a position of rest towards said predetermined orientation and passes through said orientation in the resulting oscillation, whereby upon initiation of operation of said energizing means the rotor transiently oscillates about said position of rest and in so doing initiates the larger current pulses incident to rotor rotation and progresses into complete rotations and motor action; and adjustable clamp means operable to vary the resiliency of said resilient support means without substantially altering the rest position of the magnet.

3. A self-starting timing motor comprising in combination: a pair of parallel frame members; a rotor; shaft means normal to said plates sustaining the rotor for rotation about an axis normal to the plates, said rotor defining a pair of diametrically opposed magnetic poles; a drive winding; means sustaining the drive winding in magnetic cooperation with the rotor, whereby current flow in the drive winding causes the rotor to seek a predetermined orientation; energizing means operable to produce a low continuous current flow in the drive winding and responsive to rotor rotation in predetermined direction to cause momentary relatively large current flow in the drive winding as the rotor approaches said predetermined orientation, thereby sustaining rotor rotations once the same are initiated; a magnet; spring means supporting the magnet in the magnetic field of the rotor and for oscillation about an axis substantially normal to the axis of rotor rotation and the direction of said predetermined orientation, whereby the magnet oscillates in energy dissipating forced oscillations about said last axis in response to rotor rotation about said first axis, said spring means supporting said magnet at a rest position located at an angle to said predetermined orientation in the absence of rotor movement and said low continuous current flow, the force exerted by said magnet being such that when said low continuous current flow takes place, the rotor seeks a position of rest towards said predetermined orientation and passes through said orientation in the resulting oscillation, whereby upon initiation of operation of said energizing means the rotor transiently oscillates about said position of rest and in so doing initiates the larger current pulse incident to rotor rotation and ultimately progresses into complete rotations and motor action.

4. In a self-starting timing motor, the combination of: a rotor; means sustaining the rotor for rotation about an axis; drive means responsive to rotor rotation momentarily to accelerate the rotor towards a predetermined orientation and as the rotor approaches said orientation, thereby sustaining rotations once the same are initiated; biasing means independent of rotor rotation operable to urge the rotor to a predetermined orientation; and means magnetically coupled to the rotor for vibration about a rest position in response to rotor rotations, said last means being operable in rest position and in the absence of said biasing means to orient the rotor at an orientation at an angle to said last orientation, said last means being of such strength in relation to said biasing means that when the biasing means is energized the rotor seeks an equilibrium position closer to said first orientation, whereby upon energization of said second means and said biasing means the rotor initially oscillates about said rest position and progresses to complete rotation and motor action, said last means further having a natural frequency of vibration slightly greater than the normal speed of rotor rotation to provide a speed-sensitive energy dissipating element that serves to hold the rotor speed within a narrow range.

5. In a self-starting timing motor, the combination of: a rotor; means sustaining the rotor for rotation about an axis; drive means responsive to rotor rotation momentarily to accelerate the rotor towards a predetermined orientation and as the rotor approaches said orientation, thereby sustaining rotation once initiated; biasing means independent of rotor rotation operable to urge the rotor to a predetermined orientation; and a mass supported for vibration about a rest position, at least one of said mass and said rotor being magnetized to define a magnetic coupling between the rotor and the mass to vibrate the mass about a rest position in response to rotor rotations, said rest position being so located that in the absence of said biasing means the rotor is oriented at an angle to said last orientation, the magnetic coupling between the rotor and the mass being of such strength in relation to said biasing means that when the biasing means is energized the rotor seeks an equilibrium position closer to said first orientation, whereby upon energization of said second means and said biasing means the rotor initially oscillates about said rest position and progresses to complete rotation and motor action.

6. In a self-starting timing motor, the combination of: a rotor; means sustaining the rotor for rotation about an axis; drive means responsive to rotor rotation momentarily to accelerate the rotor towards a predetermined orientation and as the rotor approaches said orientation, thereby sustaining rotation once initiated; biasing means independent of rotor rotation operable to urge the rotor to a predetermined orientation; and a mass supported for vibration about a rest position, at least one of said mass and said rotor being magnetized to define a magnetic coupling between the rotor and the mass to vibrate the mass about a rest position in response to rotor rotations, said rest position being so located that in the absence of said biasing means the rotor is oriented at an angle to said last orientation, the magnetic coupling between the rotor and the mass being of such strength in relation to said biasing means that when the biasing means is energized the rotor seeks an equilibrium position closer to said first orientation, whereby upon energization of said second means and said biasing means the rotor initially oscillates about said rest position and progresses to complete rotation and motor action, said last mass further having a natural frequency of vibration slightly greater than the normal speed of the rotor rotation to provide a speed-sensitive energy dissipating element that serves to hold the rotor speed within a narrow range.

7. A self-starting timing motor comprising: a magnetic rotor; a drive winding located within the field of the rotor and operable when energized to urge the rotor to a predetermined orientation; a control winding located to be linked by the field of the rotor; a transistor having a base and two electrodes; means connecting said winding to carry current in accord with the current between said electrodes; means defining a control circuit operable to bias one electrode in relation to the base to cause predetermined bias current flow between the electrodes; means operable to impart current between the other electrode and the base as the rotor passes a predetermined position while rotating towards said predetermined rotor position, whereby the rotor is maintained in rotation, once started; a mass; means supporting the mass for vibration about a rest position, said mass being magnetically coupled to the rotor to execute forced energy dissipating vibrations in response to rotor rotations, the rest position of the mass being so located that in the absence of current flow in said winding the rotor is oriented by the coupling to said mass at an angle to said predetermined orientation and the magnetic coupling between the rotor and the mass being of such strength in relation to the biasing current that when the biasing current is initiated the rotor seeks an equilibrium position closer to said first orientation and on the first swing reaches said predetermined position, whereby upon energization of the first means the rotor initially oscillates about said rest position and progresses to complete rotation and motor action.

8. A self-starting timing motor comprising: a magnetic rotor; a drive winding located within the field of the rotor and operable when energized to urge the rotor to a predetermined orientation; a control winding located to be linked by the field of the rotor; a transistor having a base and two electrodes; means connecting said winding to carry current in accord with the current between said electrodes; means defining a resistance element between one electrode and the base to cause predetermined bias current flow between the electrodes; means operable to impart current between the other electrode and the base as the rotor passes a predetermined position while rotating towards said predetermined rotor position, whereby the rotor is maintained in rotation, once started; a mass; means supporting the mass for vibration about a rest position, said mass being magnetically coupled to the rotor to execute forced energy dissipating vibrations in response to rotor rotations, the rest position of the mass being so located that in the absence of current flow in said winding the rotor is oriented by the coupling to said mass at an angle to said predetermined orientation and the magnetic coupling between the rotor and the mass being of such strength in relation to the biasing current that when the biasing current is initiated the rotor seeks an equilibrium position closer to said first orientation and on the first swing reaches said predetermined position, whereby upon energization of the first means the rotor initially oscillates about said rest position and progresses to complete rotation and motor action.

9. A self-starting timing motor comprising: a magnetic rotor; a drive winding located within the field of the rotor and operable when energized to urge the rotor to a predetermined orientation; a control winding located to be linked by the field of the rotor; a transistor having a base and two electrodes; means connecting said winding to carry current in accord with the current between said electrodes; a capacitor of substantial resistance connected between one electrode and the base to bias the electrode in relation to the base to cause predetermined bias current flow between the electrodes; means operable to impart current between the other electrode and the base as the rotor passes a predetermined position while rotating towards said predetermined rotor position, whereby the rotor is maintained in rotation, once started; a mass; means supporting the mass for vibration about a rest position, said mass being magnetically coupled to the rotor to execute forced energy dissipating vibrations in response to rotor rotations, the rest position of the mass being so located that in the absence of current flow in said winding the rotor is oriented by the coupling to said mass at an angle to said predetermined orientation and the magnetic coupling between the rotor and the mass being of such strength in relation to the biasing current that when the biasing current is initiated the rotor seeks an equilibrium position closer to said first orientation and on the first swing reaches said predetermined position, whereby upon energization of the first means the rotor initially oscillates about said rest position and progresses to complete rotation and motor action.

References Cited in the file of this patent

UNITED STATES PATENTS

| | | |
|---|---|---|
| 2,492,435 | Ostline | Dec. 27, 1949 |
| 2,864,018 | Aeschmann | Dec. 9, 1958 |
| 2,867,762 | Lehman et al. | Jan. 6, 1959 |
| 2,890,400 | Cluwen | June 9, 1959 |